United States Patent [19]
Ohno et al.

[11] Patent Number: 5,247,163
[45] Date of Patent: Sep. 21, 1993

[54] IC CARD HAVING A MONITOR TIMER AND A RESET SIGNAL DISCRIMINATION CIRCUIT

[75] Inventors: Hisashi Ohno; Kazuo Asami, both of Itami, Japan

[73] Assignee: Mitsubishi Denki Kabushiki Kaisha, Tokyo, Japan

[21] Appl. No.: 920,518

[22] Filed: Jul. 28, 1992

Related U.S. Application Data

[63] Continuation-in-part of Ser. No. 561,721, Aug. 1, 1990, abandoned.

[30] Foreign Application Priority Data

Apr. 20, 1990 [JP] Japan ................... 2-102989

[51] Int. Cl.$^5$ ........................................... G06K 19/07
[52] U.S. Cl. ..................................... 235/492; 371/16.3
[58] Field of Search ................... 235/380, 492, 487; 371/12, 16.3, 61-62

[56] References Cited

U.S. PATENT DOCUMENTS

| | | | |
|---|---|---|---|
| 4,586,179 | 4/1986 | Sirazi et al. | 371/16.3 |
| 4,597,052 | 6/1986 | Matsuda | 364/550 |
| 4,610,013 | 9/1986 | Long et al. | 371/16.3 |
| 4,924,075 | 5/1990 | Tanaka | 235/380 |

FOREIGN PATENT DOCUMENTS 0335494  2/1989  European Pat. Off. .
63-51194  3/1988  Japan .
63-284692  11/1988  Japan .

OTHER PUBLICATIONS

Nikkei Electronics, "Non-contact type IC card utilizing light for data communication", 1988, 10.3, No. 457, pp. 197-202.
"Watchdog Timer", Intel MCS®-96 Architectural Overview, Embedded Controller Handbook, 1987, pp. 12-40/12-41.

Primary Examiner—Robert A. Weinhardt
Attorney, Agent, or Firm—Leydig, Voit & Mayer

[57] ABSTRACT

An IC card includes a CPU for processing data, a data receiving circuit for receiving data and inputting the data to the CPU, a data transmitting circuit for transmitting data from the CPU, a reset receiving device for receiving an external reset signal, a monitor timer for generating a timer reset signal when there is no response after a prescribed time has elapsed following receipt of data by the data receiving circuit, and a discrimination circuit for determining which of the external reset signal or a timer reset signal from the monitor timer has been received, holding the determination, and resetting the CPU in response to a reset signal.

9 Claims, 3 Drawing Sheets

FIG. I

IC CARD HAVING A MONITOR TIMER AND A RESET SIGNAL DISCRIMINATION CIRCUIT

This application is a continuation in part of application Ser. No. 07/561,721, filed Aug. 1, 1990, now abandoned.

BACKGROUND OF THE INVENTION

1. Field of the Invention

The present invention relates to an IC card and, in particular, to an IC card having a monitor timer.

2. Description of the Related Art

The structure of a conventional IC card is shown in FIG. 4. A stop signal output circuit 2 is connected to a CPU 1. A reset receiving circuit 3 and a monitor timer 4 are connected to the stop signal output circuit 2. In addition, this IC card has a data receiving circuit and a data transmitting circuit (not shown) connected to the CPU 1 for respectively receiving and transmitting data between this card and a terminal device (not shown).

In operation, after data from the terminal device is received in the data receiving circuit, it is input to the CPU 1 where a prescribed process is performed. Subsequently, transmission data is transmitted to the terminal device from the data transmitting circuit as required.

Now suppose that a certain failure occurs in an IC card system which includes the terminal device and the IC card and an external reset signal is issued from the terminal device in order to stop the CPU 1. When this external reset signal is received by the reset receiving circuit 3 of the IC card, a reset signal $S_1$ is output to the stop signal output circuit 2 from the reset receiving circuit 3. The stop signal output circuit 2 then outputs a stop signal $S_3$ to the CPU 1, causing the CPU 1 to be reset.

The monitor timer 4 connected to the stop signal output circuit 2 measures the time up to the next response after the reception of a data transmission or the like from the terminal device. Monitor timer 4 overflows when there is no next response from the terminal device and a preset time has elapsed. Monitor timer 4 then outputs a reset signal $S_2$ to the stop signal output circuit 2 to stop the CPU 1. The stop signal output circuit 2 that has received the reset signal $S_2$ from the monitor timer 4 outputs the stop signal $S_3$ to the CPU 1 in the same manner as when it receives the reset signal $S_1$ from the reset receiving circuit 3. As a result, the CPU 1 enters the stopped state.

Since the stop signal output circuit 2 outputs a stop signal $S_3$ both when it receives the reset signal $S_1$ from the reset receiving circuit 3 and when it receives the reset signal $S_2$ from the monitor timer 4, it cannot be determined which reset signal has caused the CPU 1 to be reset.

That is, it is difficult in the conventional IC card to analyze whether, when a failure occurs and the CPU 1 is reset, this reset is caused by the reception of an external reset signal from the terminal device, or by the operation of the monitor timer 4, or whether noise is mixed in and a reset signal is erroneously received in the reset receiving circuit 3. As a result, there exists a problem in that recovery to a normal state takes a great deal of time and effort.

SUMMARY OF THE INVENTION

The present invention has been devised to solve the above-mentioned problems. Accordingly, an object of the present invention is to provide an IC card in which the cause of a failure can easily be analyzed when a CPU is reset due to the failure.

The IC card of the present invention comprises a CPU for processing data, a data receiving circuit for receiving data from the outside and inputting it to the CPU, a data transmitting circuit for transmitting data from the CPU to the outside, a reset receiving means for receiving a reset signal from the outside, a monitor timer for generating a timer reset signal when there is no next response and a prescribed time has elapsed after the data receiving circuit has received a response from the outside, and a determining circuit for discriminating which signal is input when either reset signal from the reset receiving means or a timer reset signal from the monitor timer is input, holding the determination, and resetting the CPU.

In the present invention, when the discrimination circuit receives an external reset signal, from the reset receiving means or a timer signal from the monitor timer, it determines which signal has been received, holds the determination, and resets the CPU.

These and other objects, features and advantages of the present invention will become clear in the following description of the preferred embodiments of the present invention, together with reference to the accompanying drawings.

DESCRIPTION OF THE PREFERRED EMBODIMENTS

Embodiments of the present invention will be explained hereinunder with reference to the accompanying drawings.

Figure 1:
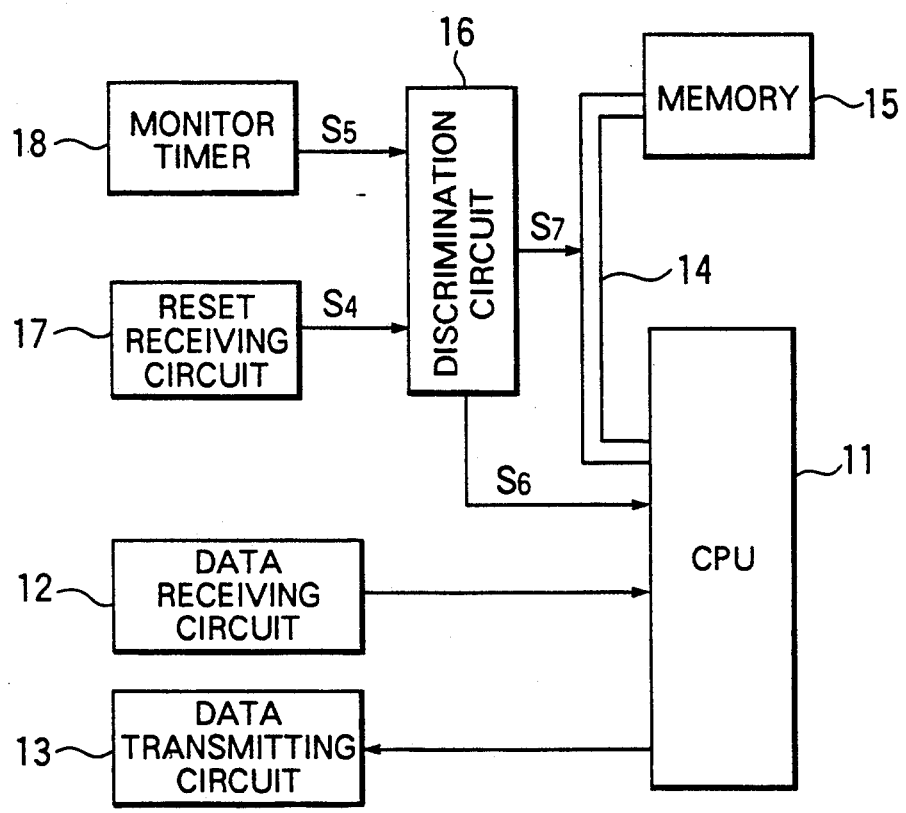
FIG. 1 is a block diagram illustrating an IC card in one embodiment of the present invention.

In FIG. 1, the IC card has a CPU 11, to which are connected a data receiving circuit 12 and a data transmitting circuit 13 for respectively receiving data from and transmitting data to a terminal device (not shown). A memory 15 is connected to the CPU 11 via a data bus 14, and a discrimination circuit 16 is connected to the CPU 11 and the data bus 14. In addition, a reset receiving circuit 17 and a monitor timer 18 are connected to the discrimination circuit 16. The monitor timer 18 is also connected to the CPU 11.

The reset receiving circuit 17 receives a signal from the terminal device and outputs an external reset signal $S_4$ to the discrimination circuit 16. The monitor timer 18 is reset by the CPU 11 upon reception of data from the terminal device at the data receiving circuit 12. The monitor timer 18 measures the elapsed time until the next response from the terminal device and outputs a timer reset signal $S_5$ to the discrimination circuit 16 when the monitor timer 18 is not reset by the CPU 11, i.e., when there is no next response from the terminal device within a prescribed elapsed time. When the discrimination circuit 16 receives an external reset signal $S_4$ from the reset receiving circuit 17 or a timer reset signal $S_5$ from the monitor timer 18, it outputs a stop signal $S_6$ to the CPU 11 and determines which of the external reset signal $S_4$ or the timer reset signal $S_5$ has been received.

Figure 2:
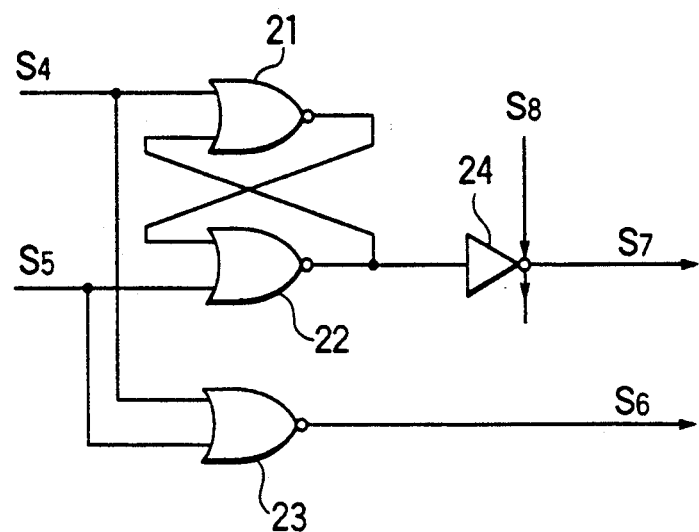
FIG. 2 is a circuit diagram illustrating the internal structure of a discrimination circuit in an embodiment of the invention.

FIG. 2 shows the internal structure of the discrimination circuit 16. The discrimination circuit 16 comprises NOR circuits 21 to 23 and an inverter circuit 24. The first NOR circuit 21 receives the external reset signal $S_4$ from the reset receiving circuit 17 and an output signal from the second NOR circuit 22. The second NOR circuit 22 receives the timer reset signal $S_5$ from the monitor timer 18 and the output signal of the first NOR circuit 21. The third NOR circuit 23 receives the external reset signal $S_4$ and the timer reset signal $S_5$. The inverter circuit 24 is connected to the output of the second NOR circuit 22 and the output of this inverter circuit 24 is connected to a "0" bit line of the data bus 14. When a discrimination circuit read signal $S_8$ is input to the inverter circuit 24, the level of the output of the second NOR circuit 22 is reversed and then output to the data bus 14 as a discrimination signal $S_7$. The output signal of the third NOR circuit 23 is input to the CPU 11 as a stop signal $S_6$.

The IC card of FIG. 1 sends data to and receives data from the terminal device using electromagnetic waves. The data receiving circuit 12, the data transmitting circuit 13 and the reset receiving circuit 17 each have respective antenna 12', 13' and 17'. Also, these circuits 12, 13 and 17 may instead have one antenna circuit in common.

Next, the operation of the embodiment will be explained. First, when data is transmitted from the unillustrated terminal device, this data is received in the data receiving circuit 12, then it is input to the CPU 11 where prescribed processing is performed. The CPU 11 resets the monitor 18 periodically during the processing. Next, data which has been processed by the CPU 11 is stored in the memory 15 via the data bus 14 as required or transmitted to the terminal device from the data transmitting circuit 13.

Now suppose that a reset signal is issued from the terminal device. When this external reset signal is received by the reset receiving circuit 17 of the IC card, the external reset signal $S_4$ of "H" level is output to the discrimination circuit 16 from the reset receiving circuit 17. Then, since the output of the first NOR circuit 21 is turned to "L" level in FIG. 2, the output of the second NOR circuit 22 becomes "H" level and is input to the inverter circuit 24. On the other hand, the output of the third NOR circuit 23 is turned to "L" level and input to the CPU 11 as a stop signal $S_6$, causing the CPU 11 to be reset.

Next, in order to recognize the determination, the CPU 11 is activated again to specify a specific address and to output a discrimination circuit read signal $S_8$ applied to the inverter circuit 24 of the discrimination circuit 16. Then, the output of the second NOR circuit 22 is reversed to "L" level and is output to the "0" bit line of the data bus 14. Therefore, by reading the level of the "0" bit line of this specific address data, it can be recognized that, because it is at "L" level, the reset is caused by the external reset signal $S_4$.

On the other hand, when the monitor timer 18 overflows because there is no next response from the terminal device after a prescribed time has elapsed following the reception of a data transmission from the terminal device, the monitor timer 18 outputs the timer reset signal $S_5$ of "H" level to the discrimination circuit 16 in order to stop the CPU 11. Then, the output of the second NOR circuit 22 is turned to "L" level and is input to the inverter circuit 24. On the other hand, the output of the third NOR circuit 23 becomes "L" level in the same manner as when the above-mentioned reset signal $S_4$ of "H" level is input, and is input to the CPU 11 as a stop signal $S_6$, which causes the CPU 11 to be reset.

Next, the CPU 11 is activated again to recognize the determination, and the above-mentioned specific address is specified and the discrimination circuit read signal $S_8$ is output to the inverter circuit 24 of the discrimination circuit 16 from the CPU 11. Then, the output of the second NOR circuit 22 is reversed to "H" level and is output to the "0" bit line of the data bus 14 as a discrimination signal $S_7$. Thus, by reading the level of the "0" bit line of this specific address data, it can be recognized that the reset is caused by the timer reset signal $S_5$ because the level of the "0" bit line is at "H".

As mentioned above, in this embodiment, when the discrimination circuit 16 receives either the external reset signal $S_4$ or the timer reset signal $S_5$, it determines which signal it has received and holds the determination as the level of the output signal of the second NOR circuit 22. In addition, the determination can be read via the inverter circuit 24 by using the discrimination circuit read signal $S_8$. That is, in a case where a failure occurs and the CPU 11 is reset, it can easily be determined whether this reset is caused by the reception of an external reset signal from the terminal device or by the "timing out" of, i.e., generation of a timer reset signal by, the monitor timer 18. Therefore, removing the cause of a failure and returning to a normal state is easy and speedy.

Figure 3:
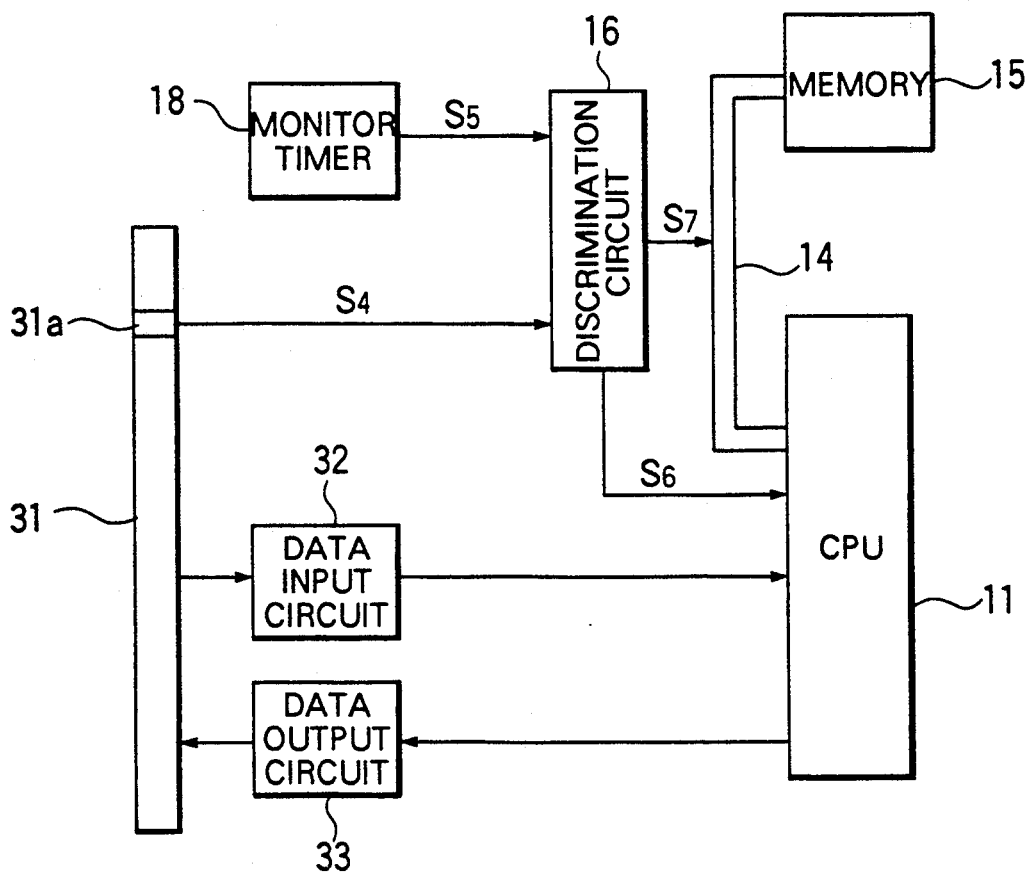
FIG. 3 is a block diagram illustrating another embodiment of the invention.
Figure 4:
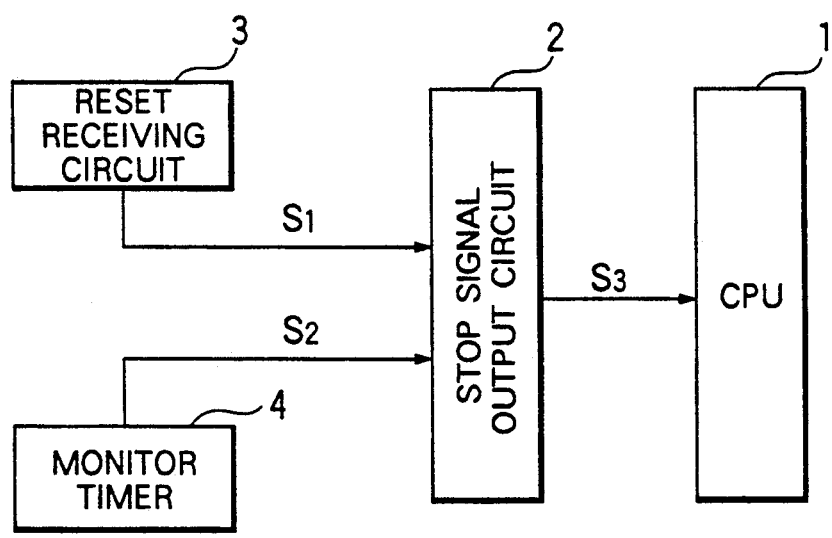
FIG. 4 is a block diagram illustrating a conventional IC card.

The IC card of FIG. 1 is a non-contact type IC card using electromagnetic waves. It may be a contact type IC card using a multiple conductor connector 31, as shown in FIG. 3. In that IC card, the CPU 11 is connected to the connector 31 via a data input circuit 32 and a data output circuit 33. The data input circuit 32 and the data output circuit 33 correspond to the data receiving circuit 12 and the data transmitting circuit 13 of FIG. 1 respectively. Because this contact type card inputs data from and outputs data to a terminal device (not shown) via the connector 31, an antenna circuit is not required and therefore the circuits 32 and 33 have no antenna circuit. The connector 31 has an external reset signal input terminal 31a connected to the discrimination circuit 16. The contact type IC card designed as described above has advantages similar to the non-contact type IC card of FIG. 1. In this case, an external reset signal $S_4$ is directly input to the discrimination circuit 16 from the terminal device via the input terminal 31a of the connector 31.

Many widely different embodiments of the present invention can be made without departing from the spirit and scope thereof, therefore it is to be understood that this invention is not limited to the specific embodiments described but only by in the appended claims.

What is claimed is:

1. An IC card comprising:
   a CPU for processing data;
   a data receiving circuit connected to said CPU for receiving external data from a terminal external to said IC card and inputting the external data to said CPU;
   a data transmitting circuit connected to said CPU for transmitting response data from said CPU to the terminal external to said IC card;

a reset receiving means for receiving an external reset signal from the terminal external to said IC card;

a monitor timer connected to and reset by said CPU for generating a timer reset signal after a prescribed time has elapsed without being reset by said CPU, said CPU resetting said monitor timer in response to receipt of external data by said data receiving circuit; and a discrimination circuit, connected to said reset receiving means for receiving an external reset signal, to said monitor timer for receiving a timer reset signal, and to said CPU for resetting said CPU in response to receipt of either of an external reset signal and a timer reset signal, for determining, after resetting of said CPU, which of an external reset signal and a timer reset signal has been received by said discrimination circuit, for generating a discrimination signal indicative of the determination, and for holding the discrimination signal for analysis of resetting of said CPU.

2. An IC card according to claim 1 comprising:
a memory for storing data; and
a data bus connecting said CPU to said memory.

3. An IC card according to claim 2 wherein said discrimination circuit outputs the discrimination signal to said data bus.

4. An IC card according to claim 3 wherein said discrimination circuit includes a first NOR circuit connected to receive the external reset signal, a second NOR circuit connected to receive the timer reset signal and the output of said first NOR circuit, a third NOR circuit connected to receive both the external reset and timer reset signals, and an inverter circuit connected to receive the output of said second NOR circuit, said first NOR circuit connected to receive the output of said second NOR circuit, the output of said third NOR circuit being connected to said CPU, and the output of said inverter circuit being connected to said data bus.

5. An IC card according to claim 1 wherein said reset receiving means includes an antenna for receiving the external reset signal as an electromagnetic wave.

6. An IC card according to claim 1 comprising a multiple conductor connector electrically connected to said IC card and including one conductor for receiving the external reset signal.

7. An IC card comprising:

a CPU for processing data, said CPU being reset upon receipt of a stop signal and generating a read signal in response to receipt of a stop signal;

a data receiving circuit connected to said CPU for receiving external data from a terminal external to said IC card and inputting the external data to said CPU;

a data transmitting circuit connected to said CPU for transmitting response data from said CPU to the terminal external to said IC card;

a reset receiving means for receiving an external reset signal from the terminal external to said IC card;

a monitor timer connected to and reset by said CPU for generating a timer reset signal after a prescribed time has elapsed without being reset by said CPU, said CPU resetting said monitor timer in response to receipt of external data by said data receiving circuit; and a discrimination circuit, connected to said reset receiving means for receiving an external reset signal, to said monitor timer for receiving a timer reset signal, and to said CPU, said discrimination circuit generating a stop signal in response to receipt of either of an external reset signal and a timer reset signal and for supplying the stop signal to said CPU, thereby resetting said CPU, for determining, in response to a read signal generated by said CPU in response to receipt of the stop signal, which of an external reset signal and a timer reset signal has been received by said discrimination circuit, for generating a discrimination signal indicative of the determination, and for holding the discrimination signal for analysis of resetting of said CPU.

8. The IC card according to claim 7 wherein said discrimination circuit includes a first NOR circuit connected to receive the external reset signal, a second NOR circuit connected to receive the timer reset signal and the output of said first NOR circuit, a third NOR circuit connected to receive both the external reset and timer reset signals, and an inverter circuit connected to receive the output of said second NOR circuit, said first NOR circuit connected to receive the output of said second NOR circuit, the output of said third NOR circuit being connected to said CPU, and the output of said inverter circuit being connected to said data bus.

9. The IC card according to claim 8 wherein the output of said inverter circuit is connected to said CPU to receive the read signal, said inverter outputting the discrimination signal in response to receipt of the read signal.

* * * * *